US009509718B1

(12) United States Patent
Arthur et al.

(10) Patent No.: US 9,509,718 B1
(45) Date of Patent: Nov. 29, 2016

(54) NETWORK-ATTACHED STORAGE SOLUTION FOR APPLICATION SERVERS

(71) Applicant: Sprint Communications Company L.P., Overland Park, KS (US)

(72) Inventors: Drew Arthur, Overland Park, KS (US); Eric Biggs, Osawatomie, KS (US); Phillip Hagerman, Grandview, MO (US); Darren McGaha, Stilwell, KS (US); Matthew J. Pratt, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 103 days.

(21) Appl. No.: 14/334,403

(22) Filed: Jul. 17, 2014

(51) Int. Cl.
*H04L 29/06* (2006.01)
*G06Q 10/06* (2012.01)
*H04L 12/26* (2006.01)

(52) U.S. Cl.
CPC ............ *H04L 63/164* (2013.01); *G06Q 10/06* (2013.01); *H04L 43/00* (2013.01)

(58) Field of Classification Search
CPC . H04L 67/1097; H04L 63/164; H04L 63/08; H04L 63/0428; G06F 17/30067; G06F 21/6218; G06F 21/31
See application file for complete search history.

(56) References Cited

U.S. PATENT DOCUMENTS

| 8,516,023 | B1* | 8/2013 | Cherukuri et al. ............ 707/831 |
|---|---|---|---|
| 2006/0075199 | A1* | 4/2006 | Kallahalla et al. ............ 711/153 |
| 2011/0265164 | A1* | 10/2011 | Lucovsky et al. ................ 726/7 |
| 2011/0302415 | A1* | 12/2011 | Ahmad et al. ................ 713/168 |
| 2012/0110328 | A1* | 5/2012 | Pate et al. ..................... 713/165 |
| 2012/0185913 | A1* | 7/2012 | Martinez et al. ................ 726/1 |
| 2012/0204030 | A1* | 8/2012 | Nossik et al. ................ 713/168 |
| 2012/0222084 | A1* | 8/2012 | Beaty et al. ..................... 726/1 |
| 2013/0007845 | A1* | 1/2013 | Chang et al. ..................... 726/4 |
| 2013/0346493 | A1* | 12/2013 | Martin ........................... 709/204 |

OTHER PUBLICATIONS

Meloni, Julie C.; "Sams Teach Yourself PHP, MySQL and Apache All in One"; Sams Publishing, 2013.*

\* cited by examiner

*Primary Examiner* — Ali Abyaneh (57) ABSTRACT

A storage system for application servers is disclosed. The storage system comprises a network-attached storage device comprising a plurality of files that include a plurality of server applications in a plurality of network zone directories. Each of the network zone directories corresponds to one of a plurality of network zones. Access is restricted between each of the network zones. The storage system also comprises one or more application servers in each of the network zones. Each application server is configured to mount only a network zone directory of the network zone directories corresponding to a network zone of the network zones within which the corresponding application server resides based on a policy associated with the network-attached storage device and access one or more of the files including at least one server application of the server applications in the network zone directory.

17 Claims, 4 Drawing Sheets

NETWORK-ATTACHED STORAGE SOLUTION FOR APPLICATION SERVERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many enterprises use one or more application servers in their course of business. Traditionally, each application server has local storage and each application server writes to its local storage and accesses files (e.g., server applications or executable files) from its local storage. Additionally, log files for a particular application server are typically stored in the particular application server's local storage.

SUMMARY

In an embodiment, a storage system for application servers that utilizes a network-attached storage device rather than merely utilizing each application server's local storage is disclosed. The storage system comprises a network-attached storage device comprising a plurality of files that include a plurality of server applications in a plurality of network zone directories. Each of the plurality of network zone directories corresponds to one of a plurality of network zones. Access is restricted between each of the plurality of network zones. The storage system also comprises one or more application servers in each of the plurality of network zones. Each application server of the one or more application servers in each of the plurality of network zones is configured to mount only a network zone directory of the plurality of network zone directories corresponding to a network zone of the plurality of network zones within which the corresponding application server resides based on a policy associated with the network-attached storage device and access one or more of the plurality of files including at least one server application of the plurality of server applications in the network zone directory.

In an embodiment, a method for indirectly monitoring Apache servers using a network-attached storage device is disclosed. The method comprises disabling remote access to a status of an Apache server and enabling local access to the status of the Apache server. The method additionally comprises running a script locally on the Apache server to obtain the status of the Apache server from a memory of the Apache server, storing the obtained status of the Apache server on a network-attached storage device, and accessing, by a computer, the status of the Apache server on the network-attached storage device.

In an embodiment, a storage system for application servers that utilizes a network-attached storage device rather than merely utilizing each application server's local storage is disclosed. The storage system comprises a network-attached storage device comprising a plurality of files that include one or more server applications in one or more application server directories. The storage system also comprises a plurality of application servers configured to mount the network-attached storage device and access one or more of the plurality of files in the one or more application server directories. At least some of the plurality of application servers are configured to mount a same storage location on the network-attached storage device and access a same server application of the one or more server applications at the same storage location on the network-attached storage device instead of accessing individual server applications in their respective local storage.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The pending application is directed to a network-attached storage solution for application servers. Specifically, the pending application is directed to a storage solution for application servers, which utilizes a network-attached storage device rather than merely utilizing each application server's local storage (where an application server's local storage may be a memory disk drive or other secondary memory storage physically located inside the enclosure of the server or blade—i.e., inside the 'pizza box' of the server). Utilization of a network-attached storage device for application servers may enable a file (e.g., a server application or an executable file or plurality of executable files) to be initially loaded once (i.e., to the network-attached storage device) rather than multiple times (i.e., once to each of the application servers' local storage), thereby helping to reduce errors and inconsistencies between loaded files. Further, use of a network-attached storage device for application servers may enable the application servers to mount the same storage location on the network-attached storage device and access the same file at the same storage location on the network-attached storage device, thereby ensuring that the application servers have the same copy of the file.

In addition to the shared storage of files on the network-attached storage device and the shared mounting of the network-attached storage device between the application servers, in an embodiment, the pending application discloses centrally storing the logs for the application servers together on the network-attached storage device. This is contrary to the traditional storage of logs for application servers where each application server stores their logs in their local storage. With such a traditional storage of logs, each of the application servers would have to be individually accessed to obtain the logs for the application servers. In contrast, the pending application simplifies the retrieval of logs by centrally storing the logs for application servers together on the disclosed network-attached storage device such that only the network-attached storage device would need to be accessed to obtain the logs for the application servers.

Each of the application servers may reside in one of a plurality of network zones. Each of the plurality of network zones may not be able to interact with each other for security reasons. Thus, in an embodiment, in order to comply with the security restrictions between network zones, the pending application discloses that the network-attached storage device comprises a plurality of network zone directories and that each of the plurality of network zone directories corresponds to one of the plurality of network zones. Further, in such an embodiment, the pending application discloses that each application server residing in a particular network zone is configured to mount only the network zone directory corresponding to that particular network zone based on a policy associated with the network-attached storage device and that consequently, each application server is configured to access only files in the particular network zone directory corresponding to the network zone within which the corresponding application server resides.

In some embodiments of the pending application, at least one of the application servers, which mount the disclosed network-attached storage device, is an Apache server. An Apache server comprises a functionality to remotely and/or locally access a status of the Apache server. Enabling such a functionality to remotely access a status of the Apache server poses security risks as a hacker would like to have such information, but this information is valuable to the enterprise (e.g., for tuning and monitoring the Apache server). Therefore, the pending application discloses allowing access to Apache servers' statuses by utilizing a network-attached storage device to store the statuses of Apache servers. Specifically, in an embodiment, the pending application discloses disabling remote access to a status of an Apache server and enabling local access to the status of the Apache server. In such an embodiment, the pending application also discloses running a script locally on the Apache server to obtain the status of the Apache server from memory of the Apache server and storing the obtained status of the Apache server on the disclosed network-attached storage device. Centrally storing the statuses of Apache servers together on the network-attached storage device via the method disclosed herein simplifies the retrieval of such statuses while helping to minimize potential security vulnerabilities associated with existing functionalities of Apache servers.

Figure 1:
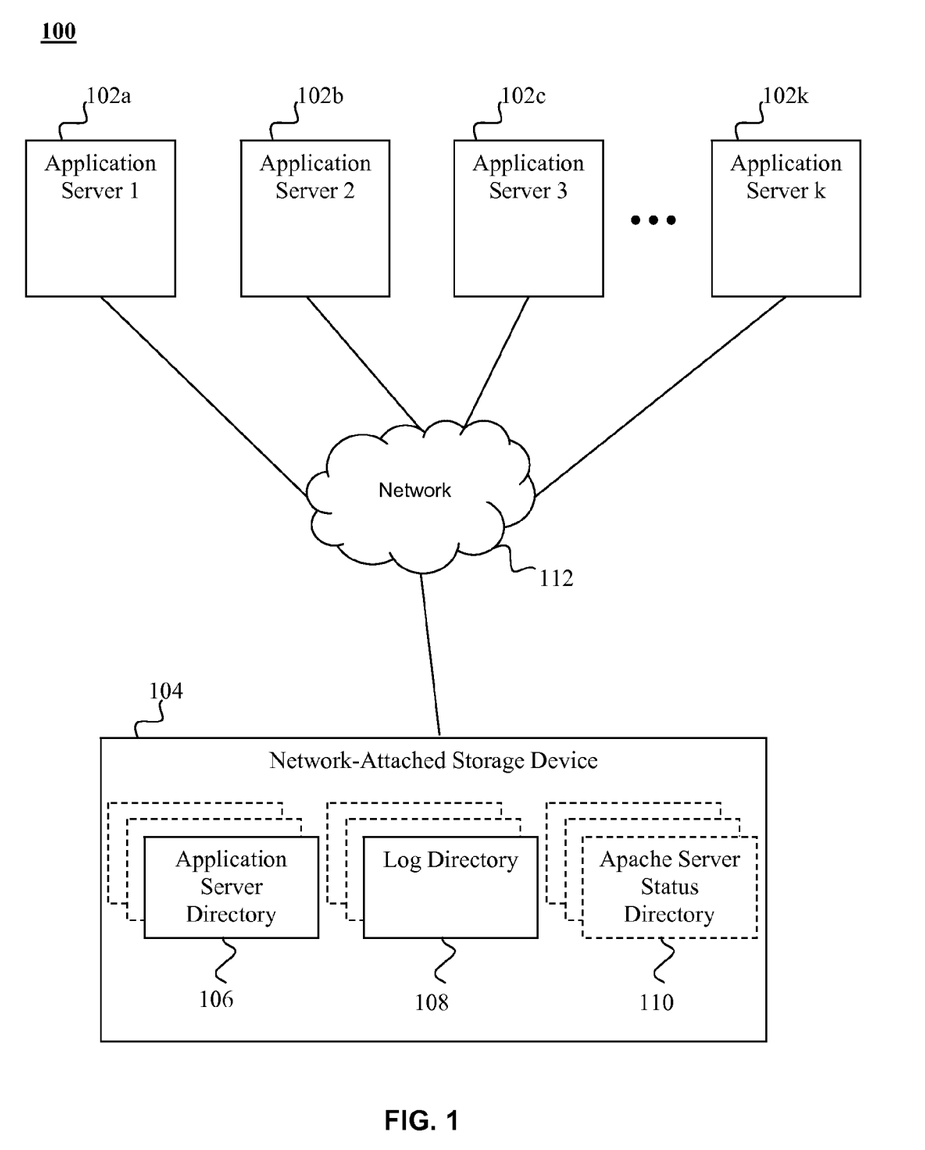
FIG. 1 is a block diagram of a storage system for application servers according to an embodiment of the disclosure.

Now turning to FIG. 1, a storage system 100 is disclosed. In an embodiment, the storage system 100 comprises a plurality of application servers 102a-102k, a network-attached storage device 104, and a network 112. In such an embodiment, the network-attached storage device 104 comprises at least one application server directory 106 and at least one log directory 108. In some embodiments, the network-attached storage device 104 also comprises at least one Apache server status directory 110. In some contexts herein, the plurality of application servers 102a-102k may be referred to as the application servers 102.

In an embodiment, the application servers 102 comprise at least one of an Apache server, a Tomcat server, a JBoss server, or another type of application server. Rather than merely utilize local storage, each of the application servers 102 may mount the network-attached storage device 104. Once each of the application servers 102 have mounted the network-attached storage device 104, files on the network-attached storage device 104 are accessible to each of the application servers 102. Stated differently, the files on the network-attached storage device 104 are not accessible to each of the application servers 102 until each of the applications servers 102 mounts the network-attached storage device 104. While FIG. 1 merely illustrates one network-attached storage device 104, the storage system 100 could comprise a plurality of network-attached storage devices without departing from the spirit or scope of the present disclosure.

The network-attached storage device 104 is data storage capacity that is accessible via a network (e.g., network 112). Specifically, the network-attached storage device 104 may be storage that is attached through the Ethernet. The network-attached storage device 104 may comprise a plurality of files in the at least one application server directory 106. The plurality of files may comprise server applications or executable files. Since the plurality of application servers 102 mount the network-attached storage device 104, one or more of the plurality of files in the at least one application server directory 106 may be accessed by the plurality application servers 102. For example, the application servers 102 may be configured to mount the same storage location on the network-attached storage device 104 and access the same file at the same storage location on the network-attached storage device 104, thereby ensuring that the application servers 102 have the same copy of the file. Also, the shared mounting of the network-attached storage device 104 between the application servers 102 allows a file to be initially loaded only once (i.e., to the network-attached storage device 104) rather than multiple times (i.e., once to each of the application servers' 102 local storage), which may help reduce errors and inconsistencies between loaded files.

In an embodiment, a plurality of the application servers 102 access the same application executable file or files stored in the network-attached storage device 104 to boot the same server application, for example by loading at least some of the application executable file or files stored in the network-attached storage device 104 in local volatile memory and executing. For example, a first application server 102a may access an application executable file stored in the network-attached storage device 104, copy the application executable file to volatile memory local to the first application server 102a, and execute the application executable file out of its local transient memory. Substantially concurrently, a second application server 102b may access the same application executable file stored in the network-attached storage device 104, copy the same application executable file to volatile memory local to the second application server 102b, and execute the application executable file out of its local transient memory.

In an embodiment, each of the application servers 102 is configured to write to a different application server directory based on a particular naming convention. For example, application server 102a may be configured to write to application server directory 106 in the network-attached storage device 104 while application server 102b may be configured to write to a different application server directory in the network-attached storage device 104. The particular naming convention, which enables each of the application servers 102 to write to a different application server directory in the network-attached storage device 104, may comprise an application identifier name field, an environment name field, and a function name field. The environment name field may be a test environment, a development environment, a production environment, or another environment. The function name field may be a log function, a configuration function, a code function, a data function, or another function. In an embodiment, the particular naming convention results in content being segmented based on application groups.

In an embodiment, the network-attached storage device 104 additionally comprises a plurality of log files for the application servers 102 in the at least one log directory 108. This central storage of the application servers' 102 logs in the network-attached storage device 104 simplifies the retrieval of the log files since only the network-attached storage device 104 needs to be accessed to obtain the logs for the application servers 102.

In some embodiments, for example when one of the application servers 102 is an Apache server, the network-attached storage device 104 additionally comprises a status of the Apache server in the at least one Apache server status directory 110. The status of an Apache server may be obtained via the method illustrated in FIG. 3 and described below. While the log directory 108 and the Apache server status directory 110 are represented as two different directories in FIG. 1, they could be merged into a single directory without departing from the spirit or scope of the present disclosure. For example, the log files for the application servers 102 and the statuses of any Apache servers may be stored together in or more directories.

In an embodiment, the network 112 is a local area network. For example, the network 112 may be a local area network enabled via the Ethernet. A local area network is a short distance communications network used to link computers and peripheral devices to enable the computers and peripheral devices to communicate with one another and share resources. In alternative embodiments, the network 112 is another type of network, for example a communicatively coupled plurality of local area networks, for example coupled via one or more bridges and/or routers. The network 112 may be a combination of one or more public networks and/or one or more private networks.

Figure 2:
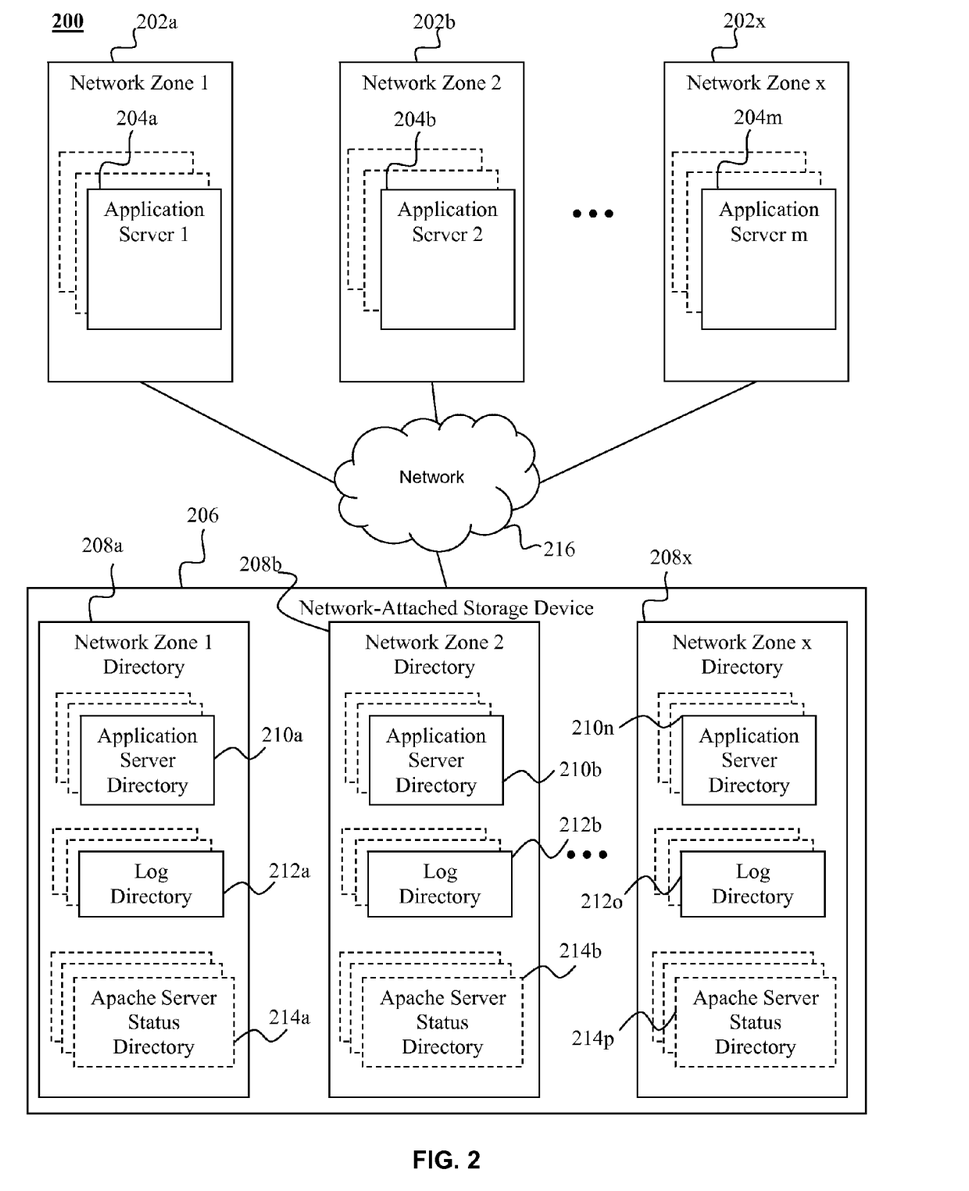
FIG. 2 is a block diagram of a storage system for application servers according to an embodiment of the disclosure.

Now turning to FIG. 2, a storage system 200 is disclosed. In an embodiment, the storage system 200 comprises a plurality of network zones 202a-202x, a plurality of application servers 204a-204m, a network-attached storage device 206, and a network 216. In such an embodiment, the network-attached storage device 206 comprises a plurality of network zone directories 208a-208x. Each of the plurality of network zone directories 208a-208x may comprise at least one application server directory 210a-210n and at least one log directory 212a-212o. In some embodiments, each of the plurality of network zone directories 208a-208x also comprises at least one Apache server status directory 214a-214p. In some contexts herein, the plurality of network zones 202a-202x, the plurality of application servers 204a-204m, and the plurality of network zone directories 208a-208x may be referred to as the network zones 202, the application servers 204, and the network zone directories 208, respectively.

In an embodiment, the network zones 202 are not able to interact with each other for security reasons. For example, application servers in one of the network zones 202 may not be able to interact with application servers in any other of the network zones 202. In some contexts, such as in an enterprise setting, the network zones 202 may be referred to as demilitarized zones or DMZs. The network zones 202 may comprise one or more of a weak network zone, a strong network zone, an enterprise network zone, or a credit card network zone. In an embodiment, the weak network zone is accessible via the public facing Internet, the strong network zone is accessible via the weak network zone, and the enterprise network zone is accessible via the strong network zone. Each network zone 202 may comprise at least one of the application servers 204. For example, network zone 1 202a may comprise application server 1 204a, network zone 2 202b may comprise application server 2 204b, and network zone x 202x may comprise application server m 204m. In an embodiment, the application servers 204 comprise at least one of an Apache server, a Tomcat server, a JBoss server, or another type of application server.

The network-attached storage device 206 is data storage capacity that is accessible via a network (e.g., network 216). Specifically, the network-attached storage device 104 may be storage that is attached through the Ethernet. While FIG. 2 merely illustrates one network-attached storage device 206, the storage system 200 could comprise a plurality of network-attached storage devices without departing from the spirit or scope of the present disclosure.

The network-attached storage device 206 may comprise a plurality of files (e.g., server applications or executable files) in the network zone directories 208. The network zone directories 208 may comprise one or more of a weak network zone directory, a strong network zone directory, an enterprise network zone directory, or a credit card network zone directory. In an embodiment, each of the network directories 208 corresponds to one of the network zones 202. For example, network zone 1 directory 208a may correspond to network zone 1 202a, network zone directory 2 208b may correspond to network zone 2 202b, and network zone x directory 208x may correspond to network zone x 202x.

As discussed above, for security reasons, network zones 202 may not be able to interact with each other. In an embodiment, in order to comply with the security restrictions between network zones 202, each of the application servers 204 is configured to mount only the network zone directory corresponding to the network zone within which the particular application server resides based on a policy associated with the network-attached storage device 206. For example, application server 1 204a residing in network zone 1 202a may be configured to mount only network zone 1 directory 208a in the network-attached storage device 206, application server 2 204b residing in network zone 2 202b may be configured to mount only network zone 2 directory 208b in the network-attached storage device 206, and application server m 204m residing in network zone x 202x may be configured to mount only network zone x directory 208x in the network-attached storage device 206. Consequently, because each of the application servers 204 is configured to mount only the network zone directory corresponding to the network zone within which the particular application server resides, each of the application servers 204 is only able to access files in the network zone directory corresponding to the network zone within which the particular application server resides.

In an embodiment, each application server within a particular network zone is configured to write to a different application server directory in the particular network zone's directory based on a particular naming convention. For example, application server 204a residing within network zone 1 202a may be configured to write to application server directory 210a in network zone 1 directory 208a while another application server residing within network zone 1 202a may be configured to write to a different application server directory in network zone 1 directory 208a. The particular naming convention, which enables each application server within a particular network zone to write to a different application server directory in the particular network zone's directory, may comprise an application identifier name field, an environment name field, a function name field, and a network zone name field. The environment name field may be a test environment, a development environment, a production environment, or another environment. The function name field may be a log function, a configuration function, a code function, a data function, or another function. The network zone name field may be a weak network zone, a strong network zone, an enterprise network zone, a credit card network zone, or another network zone. In an embodiment, the particular naming convention results in content being segmented based on application groups and network zones.

The network-attached storage device 206 may also comprise a plurality of log files for the application servers 204 in the network zone directories 208. In an embodiment, each of the network zone directories 208 comprises at least one log directory, which stores log files for application servers in the network zone associated with the corresponding network zone directory. For example, network zone 1 directory 208a may comprise at least one log directory 212a to store log files for any application servers (e.g., application server 204a) in network zone 1 202a, network zone 2 directory 208b may comprise at least one log directory 212b to store log files for any application servers (e.g., application server 204b) in network zone 2 202b, and network zone x directory 208x may comprise at least one log directory 212o to store log files for any application servers (e.g., application server 204m) in network zone x 202x. This central storage of the application servers' logs in the network-attached storage device 206 simplifies the retrieval of the log files since only the network-attached storage device 206 needs to be accessed to obtain the logs for the application servers while also complying with security limitations associated with the network zones 202.

In some embodiments, for example when one of the application servers 204 is an Apache server, the network-attached storage device 206 also comprises a status of the Apache server in the particular network zone directory corresponding to the network zone in which the Apache server resides. Each of the network zone directories 208 may comprise at least one Apache server status directory, which stores statuses for Apache application servers in the network zone associated with the corresponding network zone directory. For example, network zone 1 directory 208a may comprise at least one Apache server status directory 214a to store statuses for any Apache application servers in network zone 1 202a, network zone 2 directory 208b may comprise at least Apache server status directory 214b to store statuses for any Apache application servers in network zone 2 202b, and network zone x directory 208x may comprise at least one server status directory 214p to store statuses for any Apache application servers in network zone x 202x.

The status of an Apache server may be obtained via the method illustrated in FIG. 3 and described below. While the log directory and the Apache server status directory are represented as two different directories in each of the network zone directories 208 in FIG. 2, they could be merged into a single directory without departing from the spirit or scope of the present disclosure. For example, the log files for application server 204a and the statuses of any Apache servers in network zone 1 202a may be stored together in or more directories in the network zone 1 directory 208a.

In an embodiment, the network 216 is a local area network. For example, the network 216 may be a local area network enabled via the Ethernet. A local area network is a short distance communications network used to link computers and peripheral devices to enable the computers and peripheral devices to communicate with one another and share resources. In alternative embodiments, the network 216 is another type of network.

Figure 3:
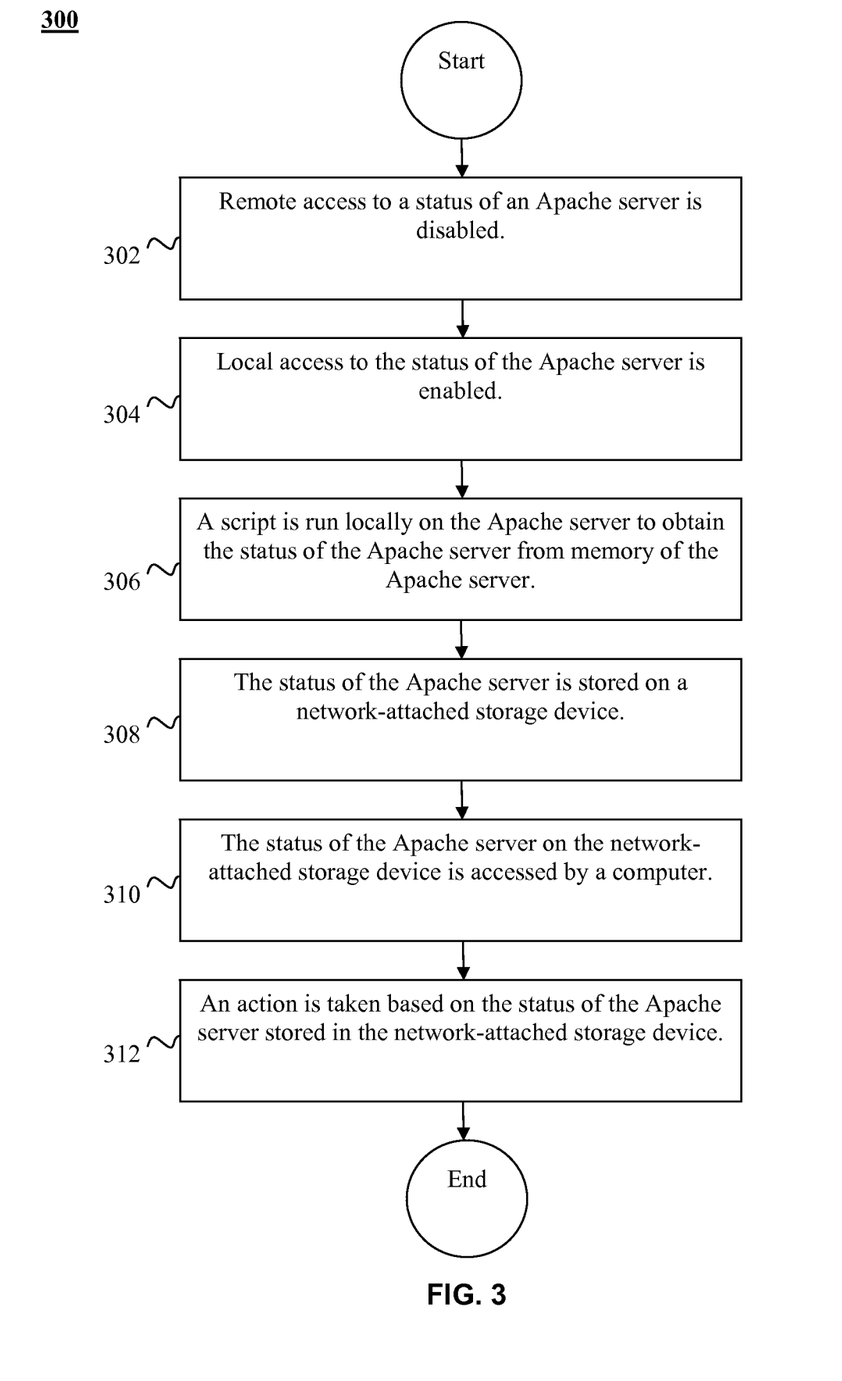
FIG. 3 is a flow chart of a method for indirectly monitoring Apache servers using a network-attached storage device according to an embodiment of the disclosure.

Now turning to FIG. 3, a method for indirectly monitoring Apache servers using a network-attached storage device 300 is described. At block 302, remote access to a status of an Apache server is disabled. The status of the Apache server may comprise at least one of a number of requests the Apache server is handling, response time, amount of headroom on the Apache server, or other information. At block 304, local access to the status of the Apache server is enabled. At block 306, a script is run locally on the Apache server to obtain the status of the Apache server from a memory of the Apache server. In an embodiment, the script is executed locally on the Apache server periodically to obtain and store a current status of the Apache server from the memory of the Apache server on the network-attached storage device. At block 308, the obtained status of the Apache server is stored on a network-attached storage device (e.g., network-attached storage device 104 in FIG. 1 or network-attached storage device 206 in FIG. 2). At block 310, the status of the Apache server on the network-attached storage device is accessed by a computer. In an embodiment, access to the status of the Apache server on the network-attached storage device is restricted based on one or more rules associated with the network-attached storage device, and the computer is authorized to access the status of the Apache server on the network-attached storage device based on the one or more rules.

At block 312, an action is taken based on the status of the Apache server stored in the network-attached storage device. The action may comprise at least one of sending an alert, increasing headroom on the Apache server, increasing other server resources to help support the Apache server, or rebooting the Apache server. Centrally storing the statuses of Apache servers together on the network-attached storage device via the above method 300 simplifies the retrieval of such statuses while helping to minimize potential security vulnerabilities associated with existing functionalities of the Apache servers (e.g., by disabling remote access to the statuses of the Apache servers).

Figure 4:
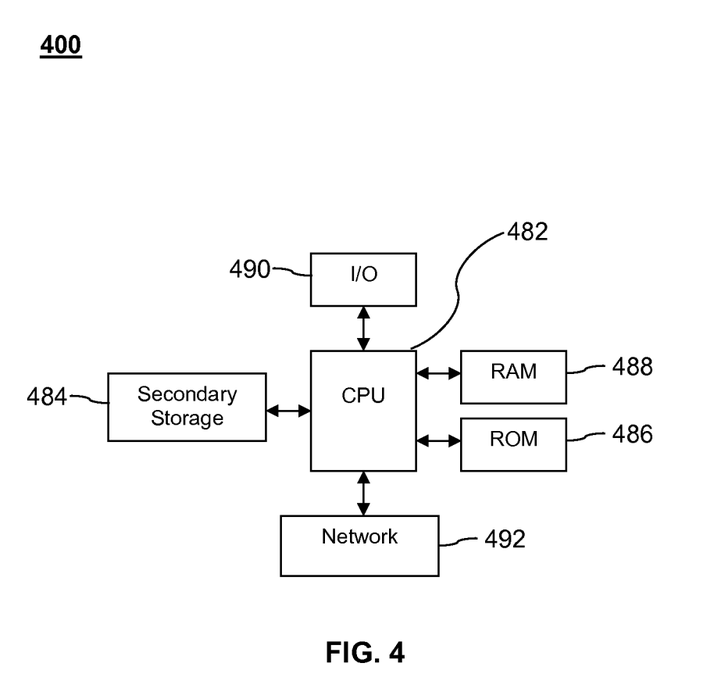
FIG. 4 illustrates an exemplary computer system that may be suitable for implementing the several embodiments of the disclosure.

FIG. 4 illustrates a computer system 400 suitable for implementing one or more embodiments disclosed herein. The computer system 400 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 400, at least one of the CPU 482, the RAM 488, and the ROM 486 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 484, to the ROM 486, to the RAM 488, and/or to other non-volatile memory and volatile memory of the computer system 400. The processor 482 may process the executable instructions and/or data structures in part by directly accessing the computer program product, for example by reading from a CD-ROM disk inserted into a disk drive peripheral of the computer system 400. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 400.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A storage system for application servers that utilizes a network-attached storage device rather than merely utilizing each application server's local storage, comprising:
    a network-attached storage device comprising a plurality of files that includes one or more server status files and a plurality of server applications in a plurality of network zone directories, wherein each of the plurality of network zone directories corresponds to one of a plurality of network zones, and wherein access is restricted between each of the plurality of network zones; and
    one or more application servers in each of the plurality of network zones, the one or more application servers communicatively coupled to the network-attached storage device via a local area network enabled through the Ethernet,
    each application server of the one or more application servers in each of the plurality of network zones is configured to:
        mount only a network zone directory of the plurality of network zone directories corresponding to a network zone of the plurality of network zones within which the corresponding application server resides based on a policy associated with the network-attached storage device, and
        access one or more of the plurality of files including at least one server application of the plurality of server applications in the network zone directory, wherein each application server is configured to access only files in the network zone directory corresponding to the network zone within which the corresponding application server resides, and wherein remote access to a status of at least one server of the plurality application servers is disabled and local access to the status is enabled, and
    the at least one server is configured to:
        run a script to obtain the status from a memory of the at least one server subsequent to the remote access being disabled and the local access being enabled, wherein the status is stored in a server status file of the one or more server status files on the network-attached storage device.

2. The storage system of claim 1, wherein the plurality of network zones comprises an enterprise network zone and at least three other different network zones, and wherein the plurality of network zone directories comprises an enterprise network zone directory and at least three other different network zone directories.

3. The storage system of claim 1, wherein the one or more application servers comprise different types of application servers.

4. The storage system of claim 1, wherein each of the network zone directories comprises one or more application server directories and one or more log directories.

5. The storage system of claim 4, wherein the one or more log directories in each network zone directory of the plurality of network zone directories comprises one or more log files associated with the one or more application servers in the corresponding network zone of the plurality of network zones.

6. The storage system of claim 4, wherein the one or more application servers in each network zone of the plurality of network zones are further configured to write to a different one of the one or more application server directories in the corresponding network zone based on a particular naming convention.

7. The storage system of claim 6, wherein the particular naming convention comprises an application identifier name field, an environment name field, a function name field, and one of the plurality of network zones name field.

8. The storage system of claim 1, wherein the status of the at least one server includes at least one of number of requests the at least one server is handling, response time, or amount of headroom on the at least one server.

9. A storage system for application servers that utilizes a network-attached storage device rather than merely utilizing each application server's local storage, comprising:
   a network-attached storage device comprising a plurality of files that includes one or more server status files and one or more server applications in one or more network zone directories, wherein each of the one or more network zone directories corresponds to one of a plurality of network zones, and wherein access is restricted between each of the plurality of network zones; and
   a plurality of application servers in each of the plurality of network zones, the plurality of application servers communicatively coupled to the network-attached storage device via a local area network enabled through the Ethernet,
      each application server of the plurality of application servers in each of the plurality of network zones is configured to:
         mount only a network zone directory of the plurality of network zone directories corresponding to a network zone of the plurality of network zones within which the corresponding application server resides based on a policy associated with the network-attached storage device, and
         access one or more of the plurality of files including at least one server application of the one or more server applications in the network zone directory, wherein each application server is configured to access only files in the network zone directory corresponding to the network zone within which the corresponding application server resides, and wherein remote access to a status of at least one server of the plurality application servers is disabled and local access to the status is enabled,
      the at least one server is configured to:
         run a script to obtain the status from a memory of the at least one server subsequent to the remote access being disabled and the local access being enabled,
      wherein the status is stored in a server status file of the one or more server status files on the network-attached storage device, and
   at least some of the plurality of application servers are configured to:
      mount a same storage location on the network-attached storage device and access a same server application of the one or more server applications at the same storage location on the network-attached storage device instead of accessing individual server applications in their respective local storage.

10. The storage system of claim 9, wherein the network-attached storage device further comprises a plurality of log files associated with the plurality of application servers in one or more log directories.

11. The storage system of claim 9, wherein the plurality of application servers comprises two or more different types of application servers.

12. The storage system of claim 9, wherein each of the network zone directories comprises one or more application server directories, and wherein each of the plurality of application servers is further configured to write to a different one of the one or more application server directories based on a particular naming convention.

13. The storage system of claim 12, wherein the particular naming convention comprises an application identifier name field, an environment name field, and a function name field.

14. The storage system of claim 13, wherein the environment field comprises test, development, or production, and wherein the function field comprises log, configuration, code, or data.

15. The storage system of claim 9, wherein the status of the at least one server includes at least one of number of requests the at least one server is handling, response time, or amount of headroom on the at least one server.

16. The storage system of claim 9, wherein at least one of an alert is sent, headroom on the at least one server is increased, other server resources are increased to help support the at least one server, or the at least one server is rebooted based on the status of the at least one server.

17. The storage system of claim 9, wherein the script is executed periodically to obtain and store a current status of the at least one server from the memory of the at least one server on the network-attached storage device.

* * * * *